(No Model.)
J. REAL.
Wagon Brake.
No. 236,082. Patented Dec. 28, 1880.
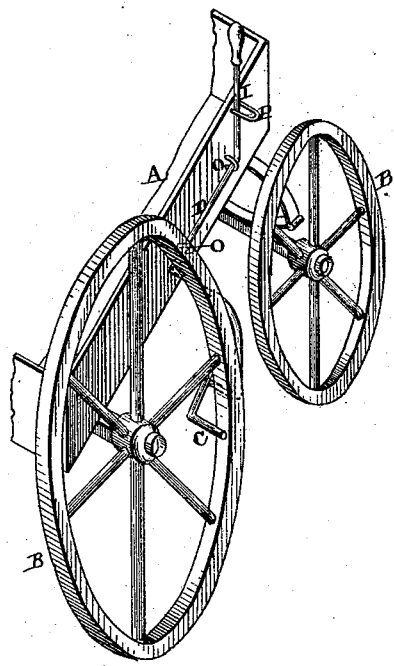
Witnesses:
Wm. N. Mortimer,
Chas. S. Jones.
Inventor:
Jno. Real.
per
F. A. Lehmann,
Atty.

UNITED STATES PATENT OFFICE.

JOHN REAL, OF NEW PROSPECT, MISSISSIPPI, ASSIGNOR OF ONE-HALF TO SOLON WOODWARD AND N. A. GASTON, OF SAME PLACE.

WAGON-BRAKE.

SPECIFICATION forming part of Letters Patent No. 236,082, dated December 28, 1880.

Application filed October 11, 1880. (No model.)

*To all whom it may concern:*

Be it known that I, JOHN REAL, of New Prospect, in the county of Choctaw and State of Mississippi, have invented certain new and useful Improvements in Wagon-Brakes; and I do hereby declare the following to be a full, clear, and exact description of the invention, such as will enable others skilled in the art to which it pertains to make and use it, reference being had to the accompanying drawing, which forms part of this specification.

My invention relates to an improvement in wagon-brakes; and it consists in making the brake, the lever, and the horizontal part which connects these two parts together out of a single continuous iron rod, whereby the brake end of the rod is made sufficiently heavy to swing inward out of the way of the wheel, and which, when forced outward by the driver, catches against one of the spokes, so as to prevent the wheel from turning, as will be more fully described hereinafter.

The object of my invention is to make the brake out of a single continuous rod, so as to do away with all the joints and connections, and to make the brake end of the rod heavy enough to automatically swing back out of the way of the wheel as soon as it is released.

The accompanying drawing is a perspective of my invention.

A represents the body of the wagon, and B the wheels thereof. The brake C, the horizontal part D, and the lever I are all made of one continuous metallic rod, which rod is secured to the side of the wagon-bed or any other suitable part of the wagon by means of the eyes O. The lever is provided with a suitable guide, P, so as to regulate its movements.

The brake end of the rod being made much longer and heavier than the lever end, as soon as the brake is released it swings back automatically toward the wagon, so as to be entirely out of the way of the wheel, and when this brake is forced outward by drawing the upper end of the lever in toward the wagon-body the end of the brake catches under one of the spokes of the wheel, at the same time that the bent portion of the brake catches against the rim of the wheel, so as to hold the wheel at two different points.

By thus making the entire brake out of a single continuous rod of iron all joints and connections are done away with, all need of a ratchet to hold the brake against the wheel is dispensed with, the cost of the brake greatly cheapened, and its operation made much more easy.

Having thus described my invention, I claim—

A wagon-brake in which the brake itself, the operating-lever, and the connecting part which connects these two parts are made from one continuous metallic rod, and pivoted to the wagon by means of eyes or staples, substantially as shown and described.

In testimony that I claim the foregoing I have hereunto set my hand this 24th day of September, 1880.

JOHN REAL.

Witnesses:
H. B. MOSS,
A. G. BRUCE.